March 22, 1955     L. R. DE VERTEUIL     2,704,552
FLUID FLOW CONTROL VALVES
Filed Sept. 13, 1950
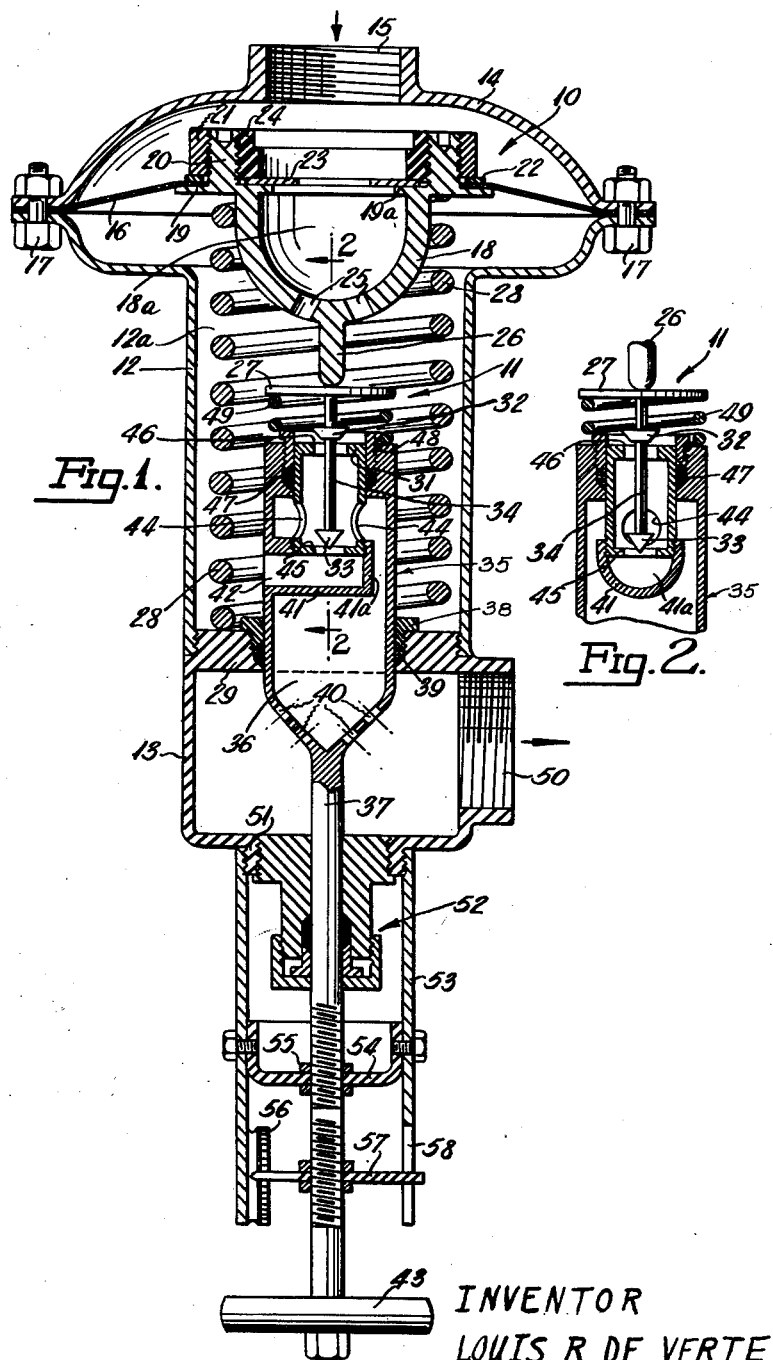
INVENTOR
LOUIS R. DE VERTEUIL
By Francis E. Boyce
Attorney

United States Patent Office 2,704,552
Patented Mar. 22, 1955

2,704,552

FLUID FLOW CONTROL VALVES

Louis Rene de Verteuil, Siparia, Trinidad, British West Indies, assignor to Apex (Trinidad) Oilfields, Limited, London, England Application September 13, 1950, Serial No. 184,638

3 Claims. (Cl. 137—498)

This invention relates to fluid flow control valve apparatus and more particularly to valve arrangements for controlling fluid flow in advance of the valve, wherein a flexible diaphragm is provided having a measuring or metering orifice therein or in a member carried thereby, through which orifice fluid flows to a control valve member positioned by the diaphragm in accordance with the difference of pressures on its opposite sides due to flow of fluid through the orifice.

One object of the present invention is to provide means for readily adjusting the rate of fluid flow through the valve port in order to determine the specific differential pressure across the metering orifice.

Another object is to provide visual means for indicating the position of the valve seat relative to the control valve member.

A further object of the invention is to provide a fluid actuated valve apparatus which, although primarily intended for the control of the rate of fluid flow in accordance with the pressure upstream or in advance of the control apparatus, may be employed to control the rate of fluid flow in accordance with the pressure downstream or in rear of the control valve apparatus by reversing the direction of the fluid flow through the apparatus.

A fluid flow control valve apparatus according to the present invention comprises a flexible diaphragm having an orifice therein through which fluid flows to a control valve member positioned by the diaphragm in accordance with the difference of pressures on its opposite sides due to the flow of fluid through the orifice, and means for adjusting the rate of fluid flow through the valve port controlled by said valve member, in order to determine the differential pressure across the metering orifice.

The means for adjusting the rate of fluid flow may comprise an axially adjustable control valve seat adapted to be moved in relation to the control valve member by manually operable means.

The means for adjusting the rate of fluid flow may be combined with visual means for indicating the degree of adjustment effected, which may be indicated in terms of specific differential pressure across the orifice. The visual indicating means comprises a graduated scale against which the axial positions of the adjustable valve seat are indicated such that each position of the valve seating corresponds to a specific differential pressure across the measuring or metering orifice.

The invention will be more readily undersood by referring to the accompanying drawings which illustrate a preferred manner of carrying out the invention and in which:

Fig. 1 shows a vertical sectional view of the apparatus.

Fig. 2 shows a fragmentary sectional view on the line 2—2 in Fig. 1.

In the drawings a metallic housing is shown enclosing a measuring orifice assembly 10 and a control valve arrangement 11. The metallic housing comprises a cylindrical flanged valve housing 12 secured to an outlet port member 13, and a dished cover plate 14 having a centrally disposed inlet port 15 formed therein. A flexible diaphragm 16 is clamped at its peripheral region between the housing 12 and the cover plate 14 by means of clamping bolts 17. The measuring orifice assembly 10 is contained in the flanged portion of the metallic housing and is secured in a fluid-tight manner to the centre of the diaphragm 16. The assembly 10 comprises a ported bucket-shaped member 18 provided with an external flange 19 which forms an annular seating for the diaphragm 16. An externally and internally screw-threaded collar 20 extends upwardly from the flange 19 and is provided externally with a clamping ring 21 adapted to be screwed down upon a sealing ring 22 interposed between the diaphragm 16 and the clamping ring 21, thus effectively securing the member 18 to the diaphragm 16. The flange 19 is continued internally of the bucket member 18 to form an annular seating 19a for an apertured measuring disc 23 detachably secured in position by means of a clamping ring 24 threaded in the collar 20. The aperture in the disc 23 forms a measuring or metering orifice. The lower part of the bucket-shaped member 18 may be of hemispherical shape and is provided therein with ports 25 connecting the cavity 18a defined by the member 18 with an annular space 12a defined by the control valve housing 12. A control valve actuating spindle 26 extends downwards from the member 18 and bears upon a spring pad or plate 27 forming part of the control valve arrangement 11.

Means are provided for opposing the axial movement of the diaphragm 16 and connected measuring orifice assembly 10 when under fluid pressure and comprises a helical spring 28 compressed between the flange 19 and a partition wall 29 forming part of the outlet member 13. Alternatively, more than one compressed helical spring 28 may be employed, and in such case the springs would be placed concentric to one another to minimize any pulsation or vibration set up by the fluid impinging on the diaphragm 16.

The control valve arrangement 11 comprises an axially adjustable valve casing 35, a valve seat member 31 and a valve member which comprises an upper conical valve head 32 and a lower conical valve head 33 interconnected by means of a valve spindle 34 which is extended above the valve body 32 and connected to the spring pad or plate 27. The valve casing 35 comprises a tubular container defining in its lower part a cavity 36 and an actuating spindle 37 extending downwards to and outside the metallic housing. The valve casing 35 is mounted for axial movement in an aperture formed in the wall 29, and a conventional type of stuffing box gland comprising a gland nut 38 and packing ring 39 may be provided in the wall 29, to effectively seal the outlet port member 13 from the annular space defined by the valve housing 12. The valve casing 35 is provided with outlet ports 40 connecting the cavity 36 with the interior of the outlet port member 13 and is further provided with an inwardly extending tubular conduit 41, one end of which is closed by a wall 41a and the other end open to the space 12a by means of a port 42 formed in the wall of the member 35. The upper wall of the conduit 41 is provided with a left hand screw-threaded hole for the reception of the similarly screw-threaded lower end of the valve seat member 31 having eduction ports 44 formed in the wall thereof and having a lower valve seat 45 and an upper valve seat 46. A stuffing box gland is conveniently provided surrounding the valve seat member 31 and comprises a packing gland 47 and a gland nut 48 received in a screw-threaded hole in the upper end of the member 35. A light compressed helical spring 49 surrounds the valve member and is confined between the spring pad 27 and the upper end of the member 35 for the purpose of keeping the valve heads 32 and 33 normally removed from the valve seats 45 and 46 in the absence of fluid pressure on the diaphragm 16. It is intended that the compressed force of the spring 49 should be greater than any fluid counter-thrust on the valve member, which may arise in operation, in consequence of pressure differential which may arise across the induction and eduction ports of the connected valve heads 32 and 33. From the above arrangement it will be seen that an axial movement of the diaphragm and connected measuring orifice assembly 10 will be transmitted to the valve spindle 34 and thus serve to increase or decrease the lift of the valve heads from their valve seats. Furthermore, the tubular conduit 41 provides an induction port to the lower valve head 33, and the internal cavity defined by the valve seat member 31 and the ports 44 provides the eduction porting from the valve seats 45 and 46 which are coaxial with one another and concentric to the axis of the valve member. For the purpose of facilitating assembly of the valve arrangement, the lower valve head 33 may be of smaller diameter than the upper valve head 32, thus permitting the lower valve head to be readily passed through the upper valve seat 46.

The outlet port member 13 is provided with an outlet port 50 and integral with its lower wall with an internally and externally screw-threaded ring 51, the internal screw-thread of which receives a conventional stuffing box gland assembly 52 surrounding the actuating spindle 37 extending from the member 35. A tubular sleeve 53 is secured at its upper end on the external screw-thread of the ring 51 and is provided with a bearing bracket 54 secured thereto and having a centrally disposed left-hand screw-threaded boss 55 for the reception of a similar screw-thread on the actuating spindle 37. The sleeve 53 carries at its outer end a graduated scale 56. A pointer 57 axially movable on the threaded region of the actuating spindle 37 and prevented from rotation by means of a guide slot 58 in the sleeve 53, is caused to move over the scale 56 when the spindle 37 is moved inwards or outwards. An actuating handle 43 is secured to the outer end of the spindle 37.

The arrangement as hereinbefore described may be modified by dispensing with the spring 49 and spring pad 27 and providing a direct integral connection between the valve spindle 34 and the actuating spindle 26. Although I have shown a pair of valve heads and valve seats, either of said valve heads and its associated valve seat may be omitted. The apparatus is adapted to be incorporated by means of the inlet port 15 and outlet port 50, in the pipe line of a fluid system in order to control the rate of flow in accordance with the pressure in advance of the control valve apparatus. The arrangement of the apparatus is such that, when flow is instituted, the fluid flows through inlet port 15 and into the cavity above the diaphragm 16 and thence, through the apertured disc 23 and into the cavity 18a. The fluid then flows from the cavity 18a through the ports 25 into the annular space or cavity defined by the cylindrical valve housing 12, and the fluid flows from the said cavity through the ports defined by the upper and lower valve seats 46 and 45 and thence into the internal cavity defined by the valve seat member 31 and from there through the eduction ports 44 into the cavity 36 in the lower part of the member 35. The ports 40 will permit the fluid to flow into the outlet port member 13 and thence through the main outlet port 50 from the apparatus.

The operation of the apparatus for effecting continuous differential control and the method of adjusting the rate of fluid flow is as follows: In all fluid flow control systems it is an essential prerequisite that the flow system should permit of a greater rate of flow in the absence of a control valve than that rate of flow specified as the desired controlled rate. Furthermore, it may be recognized that, for any one size of measuring orifice, the value of the differential pressure created across the orifice by the flow of fluid is a function of the rate of flow and, in this instance, where a diaphragm is employed, the differential pressure is also imposed across the flexible diaphragm which is loaded by the compressed helical spring bearing against the underside of the diaphragm.

It will be understood that as the amount of compression of the compressed helical spring 28 is a linear function of any load thereon, it follows that the axial movement of the orifice plate 23 and the diaphragm is a linear function of change of differential pressure across the flexible diaphragm 16 and orifice plate 23, which differential pressure in turn is a function of the rate of flow. It follows, therefore, that independent of the measuring orifice size there is a definite axial position of the diaphragm and valve-actuating spindle 26, for any one differential pressure, and any change of rate of flow is immediately accompanied by a change of said position. As the valve-actuating spindle 26 actuates the valve member, the axial movement of the valve heads 32 and 33 is governed in like manner to that of the orifice. The large helical spring is so designed that it can lift the orifice assembly 10 to a greater height than the distance through which the valve heads 32 and 33 require to be lifted by the spring 49 in order fully to open the ports in the valve seats 45 and 46, that is to say, any further rising movement of the valve stem 36 and the plate 27 carried thereby as the plate 27 follows any further upward movement of the spindle 26 does not result in any further increase in the flow of fluid through the valve ports. The control of fluid flow through the valve ports thus takes place only during the lower part of the travel of the diaphragm 16.

The position of the valve seats can be manually adjusted axially by rotation of the spindle 37 to which they are connected, as previously described. The maximum axial movement of said valve seats is limited according to the range of variation of differential pressures permitted in commercial use of the apparatus. As the rates of fluid flow through the measurement orifice and between the valves and their seats are the same, it follows that for any selected position of the valve seats the differential pressure is, for all practical purposes, a specific value and consequently the rate of flow (in the case of gas for a particular static pressure) is also specific.

I claim:

1. A fluid flow control valve apparatus comprising a diaphragm casing divided by a centrally apertured transverse flexible diaphragm into inlet and outlet compartments communicating with each other through a central aperture in said diaphragm, a fluid inlet connection in said diaphragm casing in axial alignment with said central aperture, said fluid inlet connection opening into said inlet compartment, a control valve housing extending from said casing, the interior of said housing being open to said outlet compartment, a ring clamped to said diaphragm and positioned within the aperture in said diaphragm, said ring defining a metering orifice through the diaphragm, a dome-shaped member secured at its base to said diaphragm concentrically with respect to said ring, said dome-shaped member being apertured and extending from said diaphragm into the outlet compartment, a spindle projecting axially from the centre of the crown of said dome-shaped member and extending into said housing, a division member dividing the interior of said housing into a control valve chamber and an outlet chamber, a hollow valve body slidable axially through said division member and projecting axially into said valve chamber, said valve body having outlet ports opening into said outlet chamber and having a central port opening from said control valve chamber into the interior of said valve body, a valve seat in said central port, a valve head co-operating with said valve seat, a valve stem on which said valve head is mounted, a spring urging said valve stem towards or into contact with the spindle on said dome-shaped member, a spring encircling said valve body and in compression between said division member and said diaphragm, and means manually operable from outside said housing and extending thereinto for axially adjusting the position of said valve body.

2. A fluid flow control valve apparatus as specified in claim 1 wherein the manually operable means for axially adjusting the position of the valve body comprises a rod extending from said valve body out through the outlet chamber and through a stuffing box therein, said rod having a screw-threaded portion externally of said outlet chamber, a nut threaded on said screw-threaded portion, means fixing said nut against rotation, and a manually-operable member fixed on said rod for rotating it to move said rod axially through said nut.

3. A fluid flow control valve apparatus comprising a diaphragm casing divided by a centrally apertured transverse flexible diaphragm into inlet and outlet compartments communicating with each other through a central aperture in said diaphragm, a fluid inlet connection in said diaphragm casing in axial alignment with said central aperture, said fluid inlet connection opening into said inlet compartment, a control valve housing extending from said casing, the interior of said housing being open to said outlet compartment, a ring clamped to said diaphragm and positioned within the aperture in said diaphragm, said ring defining a metering orifice through the diaphragm, a dome-shaped member secured at its base to said diaphragm concentrically with respect to said ring, said dome-shaped member being apertured and extending from said diaphragm into the outlet compartment, a spindle projecting axially from the centre of the crown of said dome-shaped member and extending into said housing, a division member dividing the interior of said housing into a control valve chamber and an outlet chamber, a hollow valve casing slidable axially through said division member and projecting axially into said valve chamber, said valve casing having outlet ports opening into said outlet chamber, a pair of conical valve heads controlling ports in said hollow valve casing within the control valve chamber, a valve stem interconnecting said valve heads in axial alignment with the spindle projecting from the dome-shaped member, a light spring urging said valve stem towards or into contact with said spindle, a stronger spring encircling said valve casing and in compression between said division member and said diaphragm, and means manually operable from outside said housing and extending thereinto for axially adjusting the position of said valve casing.

References Cited in the file of this patent

UNITED STATES PATENTS

| Number | Name | Date |
|---|---|---|
| 258,500 | Storer | May 23, 1882 |
| 464,018 | Goubert | Dec. 1, 1891 |
| 734,993 | Stewart | July 28, 1903 |
| 894,784 | Vivian | July 28, 1908 |
| 1,038,527 | Coleman | Sept. 17, 1912 |
| 1,555,851 | Van Emon | Oct. 6, 1925 |
| 1,923,788 | Mastenbrook | Aug. 22, 1933 |
| 1,933,852 | Hahn | Nov. 7, 1933 |
| 2,219,408 | Benz et al. | Oct. 29, 1940 |
| 2,569,285 | Brown | Sept. 25, 1951 |

FOREIGN PATENTS

| 18,825 | Germany | July 17, 1882 |
|---|---|---|